United States Patent Office 2,734,909
Patented Feb. 14, 1956

2,734,909

OXIDATION OF CYANOALKANES TO CYANO-ALKENES WITH MOLECULAR OXYGEN

Robert E. Gee, Jr., and Hugh J. Hagemeyer, Jr., Kingsport, Tenn., assignors to Eastman Kodak Company, Rochester, N. Y., a corporation of New Jersey No Drawing. Application February 28, 1952,
Serial No. 274,065

3 Claims. (Cl. 260—465.9)

The present invention relates to the production of unsaturated nitriles by means of oxidation of the corresponding saturated nitriles with molecular oxygen. More particularly, the invention is concerned with promoters for use in the above-identified process.

Hagemeyer U. S. patent application Serial No. 191,072, filed October 18, 1950, now Patent No. 2,701,260, is concerned with the oxidation of cyanoalkanes to produce cyanoalkenes. The oxidation process as disclosed in that application is new and distinguishes from the prior method of dehydrogenation of saturated nitriles to unsaturated nitriles. Loder Patent 2,554,484, issued May 29, 1951, discloses procedure whereby cyanoalkanes are oxidized by molecular oxygen to cyanoalkenes in the vapor phase. As disclosed in the aforementioned places, the process preferably is carried out in the presence of a catalyst. The catalyst may be of the supported type as disclosed and claimed in Hagemeyer and Stringer U. S. application Serial No. 266,796, filed January 16, 1952. In Hagemeyer and Hull, application Serial No. 243,362, filed August 23, 1951, the process disclosed and claimed involves the addition of a heated inert diluent gas.

It further has been suggested that the oxidation advantageously may be performed in the presence of a small amount of elemental iodine as a catalyst. While processes of the general type described, i. e. vapor phase oxidation, have proved quite successful, we have discovered a means for improving the results achieved, and the present invention is especially concerned with improved procedures utilizing halogen-type promoters, particularly as promoters for oxidation otherwise catalyzed by catalysts of the prior art, especially catalysts containing metal atoms.

In accordance with our invention an improved method for the molecular oxygen oxidation of saturated nitriles of the formula $R(R')CH-CH(R^2)-CN$, wherein R, R' and $R^2$ are selected from the group consisting of hydrogen, alkyl, aryl, alkylaryl and arylalkyl radicals to the corresponding unsaturated nitriles of the formula $R(R')C=C(R^2)CN$ comprises the step of conducting the oxidation in the presence of a halogen promoter substance selected from the group of halides consisting of hydrogen halides and organo halides, particularly the latter. While the effect of the use of a halide as a promoter in accordance with our invention may be quite small, the utility is considerable when evaluated in the light of the fact that the oxidation process gives a relatively low conversion per pass to the unsaturated nitrile. When the effect is multiplied by the number of passes required to convert all of the saturated nitrile to unsaturated nitrile, a quite substantial improvement in the process and yield results.

Accordingly, it is an object of the invention to provide an improved method for the oxidation of saturated nitriles. It is a specific object to provide for promotion of the formation of unsaturated nitrile products in the oxidation reaction. Another object is to provide for conditioning the oxidation catalysts. A still further object is to provide promoters and oxidation processes employing the same, which will result in stabilization of the unsaturated nitrile produced during separation and purification thereof. Another object of the invention is to improve the known catalytic oxidation process in the respect of producing higher catalytic activity, longer catalyst life and higher yields. Another object is to provide for stabilization of the crude unsaturated nitrile product so that the unsaturated nitrile may be separated, as by distillation without undue polymerization and condensation reaction losses. Other objects will be evident to those skilled in the art from the following specification and claims.

In accordance with the invention, a saturated nitrile is vaporized and preheated to 150–600° C. The promoter in appropriate amount is added to the vaporized saturated nitrile feed, or fed to the preheater and/or the reaction zone separately and mixed there with the saturated nitrile vapor. Air and/or oxygen and/or an oxygen containing gas is added to the preheated nitrile feed immediately before entering or within the catalyst bed. The mixture of saturated nitrile vapor, oxygen containing gas and promoter passes through the reaction zone, preferably containing a catalyst at a temperature in the range of about 500°–800° C. and the effluent gas is cooled and condensed. The unsaturated nitrile is recovered from the condensate. The reaction may be represented by the following equation showing the oxidation of propionitrile to acrylonitrile:

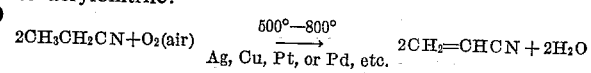

$$2CH_3CH_2CN + O_2(\text{air}) \xrightarrow[\text{Ag, Cu, Pt, or Pd, etc.}]{500°-800°} 2CH_2{=}CHCN + 2H_2O$$

As will be noted from the formula given in connection with the statement of invention above, the saturated nitriles with which the invention is useful are those containing at least one hydrogen atom on each of the alpha and beta carbon atoms, the other substituent on these carbons being either hydrogen, alkyl, aryl, alkylaryl or arylalkyl. The invention has been found particularly advantageous when employed in the oxidation of the lower saturated aliphatic nitriles, exemplified by propionitrile and isobutyronitrile.

As will be clear from the applications and patents referred to above, the oxidant may be any gaseous source of molecular oxygen which has no adverse effect on the reaction. For example, oxygen, air, or oxygen-air mixtures preferably are used.

The mole ratio of oxygen to saturated nitrile can be varied within wide limits, depending on the preheat temperature, contact time, reactor temperature and conversion per pass desired. A quantity of oxygen equivalent to the unsaturated nitrile produced may be advantageously employed. Usually, we find it best to use a mole quantity of oxygen slightly less than that required to maintain the desired reactor temperature. In such cases it may be desirable to supply some external heat in order to make up the sensible heat loss. As a general statement, it may be said that a ratio of gram moles of saturated nitrile to gram atoms of oxygen should be within the range of about 5 to 1 to 2 to 1. Diluents such as steam, nitrogen, carbon dioxide, gaseous paraffins and hydrogen and other gases inert to the constituents of the mixture may be employed. These may be used and/or preheated separately to make up the sensible heat loss and to exert a mass action effect in promoting the formation of unsaturated nitrile.

The invention is intended for use in oxidation reactions catalyzed by metals, e. g. metal alloys, free metals or mixtures thereof. The highest degree of utility is reached in the oxidation of cyanoalkanes wherein there is employed a catalyst comprising metallic copper, silver, platinum, palladium, gold, ruthenium, iridium or rhodium, or alloys or mixtures thereof. Metallic silver and copper are preferred and copper particularly is advantageous, especially where an easily polymerizable unsaturated nitrile is involved. It appears that the catalytic value of copper is enhanced to a greater extent than any other catalyst by the effect of the promoters of the invention. While the invention seems primarily useful in the case of oxidations accomplished in the presence of metal or metal alloys or mixtures it will be obvious that its utility extends to oxidations catalyzed by those other metal atom containing catalysts, that is, metal oxides, which the prior art shows to be equivalent in effect to the corresponding elemental metals. Under certain circumstances it sometimes may be possible to utilize the invention with certain other catalysts of the prior art or possibly even to derive partial benefits of the invention from use of the halide promoters in the absence of extraneous catalysts.

The metal catalysts can be used in a variety of shapes and forms, but we generally prefer to use a close-pressed bundle of screens. This insures an even distribution of heat throughout the reactor space, and minimizes the formation of local hot spots, catalyst fusions and excessive burning of the saturated nitrile feed. The catalyst may also be in the form of pellets, spaced wire screen, gauze or perforated metal plates. The metals or their corresponding easily reducible oxides may be coated or impregnated on suitable supports, such as alundum, silicon carbide, asbestos or other inert refractory material.

Regarding the promoters of the invention, it may be stated that hydrogen halides, e. g. hydrogen bromide, chloride, or iodide, or organo halides such as unsubstituted alkyl and alkenyl halides containing 1-4 carbon atoms and 1-4 halogen atoms, the halogen being bonded to the carbon, e. g. ethyl chloride, iodide and bromide, isopropyl chloride and bromide, ethylene dichloride and dibromide, chloroform, carbon tetrachloride and carbon tetrabromide advantageously may be employed. The halide promoter is used in the vaporized, saturated nitrile feed, being added thereto at any time prior to passage of the latter through the reaction zone. The amount of halide employed is quite small relative to the other components present in the reaction zone. An amount within the range of 0.01 to 1.5% of promoter, based on the weight of the feed, has proved quite useful. Somewhat lower concentrations are operative, however, since in continuous operation a cumulative effect has been observed. Thus, 0.005% or less of halide promoter based on the weight of the nitrile may be satisfactory under certain circumstances.

Temperatures employed for conducting the reaction advantageously fall within the range of about 500° C. to about 800° C. Although the improved results made possible by the present invention are particularly to be achieved by conducting the oxidation at temperatures above 500° C., it will be obvious to those skilled in the art that the invention ordinarily may have merit at somewhat lower temperatures. As will be observed from the examples below, a preferred temperature range is 570°–750° C. It should be noted that the reactor temperature can be controlled by regulating the mole ratio of oxygen to the nitrile.

The pressure under which the gases in the reaction zone are maintained appears to be insignificant as respects the results obtained. It may be stated that therefore normal, increased or decreased pressure may be employed in accordance with the teachings of the prior art. The contact time of the gases in the catalyst space preferably may be maintained within the range of 0.001–2.0 seconds. As will be noted from the examples below, an advantageous range may be said to be about 0.03–1.1 seconds.

Unsaturated nitriles which may be produced by the process of the invention include those designated by the formula given above. As examples, the following unsaturated nitriles may be mentioned: acrylonitrile, methacrylonitrile, ethacrylonitrile, alpha phenyl acrylonitrile, propyl acrylonitrile, butyl acrylonitrile, amyl acrylonitrile, hexyl acrylonitrile and similar acrylonitriles.

The invention is illustrated in the following examples:

EXAMPLE 1

A feed of ketone-free propionitrile in the vapor state was mixed with air and passed through a copper screen catalyst in a reaction zone maintained at 700–750° C. The amount of air employed was sufficient to provide a mole ratio of propionitrile to oxygen of 2 to 1. Ethylene dichloride was fed into the vaporized propionitrile prior to passage of the latter through the catalyst bed, the amount of ethylene dichloride being about 0.02% of the propionitrile by weight. Acrylonitrile was separated from the condensed effluent gases in good yield.

EXAMPLE 2

Propionitrile was oxidized to acrylonitrile with air in the presence of typical preferred catalysts with a small percent of the feed comprising a halide promoter. The reactor used in this set of runs was a double walled vessel 21" long by 1.25" O. D. with 0.16" clearance between the inner and outer walls. It was piped up so that the propionitrile vapors entering at the bottom from the vaporizer might pass upward through the outer tube, mix with air with or without diluents at the top and then pass downward through the inner tube which contained the catalyst. The halide used as a promoter was either added in the nitrile feed or was fed into the reactor with the air stream. The nitrile vapors were preheated by exchange in the upward passage through the reactor. Immediately upon leaving the reactor the gas stream was rapidly cooled by glycol condensers. The catalyst used, the halide used, the average temperature in the reaction zone, the ratio of gram moles of propionitrile (EtCN) to gram atoms of oxygen, contact times, conversions, and ultimate yields of acrylonitrile (AN) are reported in Table I.

Table I

| Run No. | Catalyst Compositions | Promoter (Wt. Percent of Feed) | Ave. Temp., °C. | EtCN/O | Contact Time, Secs. | Percent Conv. | Percent Yield | Duration of run |
| --- | --- | --- | --- | --- | --- | --- | --- | --- |
| 3 | Cu Screens (100 mesh) | 0.5 ethylene dichloride | 690 | 4.35 | 0.134 | 14.0 | 76 | 3 weeks. |
| 4 | Cu Screens (50 mesh) | do | 700 | 4.02 | 0.036 | 12.5 | 81 | 2 weeks. |
| 5 | Ag screens (100 mesh) | 0.2 chloroform | 700 | 4.15 | 0.061 | 11.4 | 69 | 3 weeks. |
| 6 | Cu pellets (⅛ inch) | 0.5 HBr | 700 | 2.96 | 0.112 | 16.2 | 71 | 6 days. |
| 7 | Pt screens (100 mesh) | 0.2 ethylene dibromide | 600 | 4.50 | 0.932 | 17.6 | 64 | 2 days. |
| 8 | 3% Pd on Alundum (⅛" pellets). | 0.5 ethylene dichloride | 700 | 4.12 | 0.540 | 13.9 | 70 | Do. |

EXAMPLE 3

Isobutyronitrile (IBN) was oxidized to methacrylonitrile (MAN) by means of air with by-product acrylonitrile (AN) being produced. The reactor set up used was essentially that used in Example 1. In Table II the conversions to methacrylonitrile and by-product acrylonitrile are shown separately while the ultimate yields to unsaturated nitrile represents the sum of the formation of these two unsaturated nitriles.

Table II

| Run No. | Catalyst Composition | Promoter (Wt. Percent of Feed) | Ave. Temp., °C. | IBN/O | Contact Time, Sec. | Percent Conv. MAN | Percent Conv. AN | Percent Yield to Unsaturated Nitrile |
|---|---|---|---|---|---|---|---|---|
| 26 | Cu pellets | 1.0 ethylene dichloride | 700 | 4.12 | 1.00 | 32.5 | 6.6 | 61 |
| 27 | do | do | 640 | 4.00 | 1.02 | 15.4 | 3.9 | 72.6 |
| 28 | do | do | 570 | 4.02 | 0.97 | 4.2 | 1.1 | 86.1 |
| 29 | 3% Pd on asbestos | 0.2 ethylene dichloride | 645 | 3.96 | 1.06 | 17.9 | 5.3 | 74.0 |
| 30 | Ag Screen (100 mesh) | 0.05 HBr | 645 | 3.78 | 1.02 | 14.9 | 3.6 | 73.0 |
| 31 | Cu Screen (100 mesh) | 0.5 isopropyl bromide | 645 | 3.93 | 1.04 | 16.3 | 3.5 | 79.6 |

From the foregoing examples it will be noted that the organo halide promoters which comprise a preferred embodiment of the invention advantageously are selected from the group of 1–4 carbon atom, 1–4 halogen atom organo halides consisting of unsubstituted lower alkyl halides and unsubstituted lower alkenyl halides. However, we do not wish or intend to be restricted in our invention excepting insofar as is necessitated by the prior art and the spirit of the appended claims.

We claim:

1. In the preparation of an α,β-unsaturated nitrile by vapor phase oxidation of a corresponding saturated nitrile of the formula

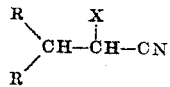

(X being selected from the group consisting of hydrogen and the methyl radical, and R and R' being selected from the group consisting of hydrogen, lower alkyl, and phenyl radicals) by means of molecular oxygen in the presence of a metallic catalyst selected from the group consisting of copper, gold, platinum, palladium, ruthenium, iridium and rhodium, said catalyst being at a temperature in the range of about 500° to 900° C., the improvement comprising the step of passing into contact with the catalyst simultaneously with the saturated nitrile feed about 0.01% to 1.5% based on the weight of the nitrile feed of ethylene dichloride.

2. Process as defined in claim 1 wherein the saturated nitrile is propionitrile.

3. Process as defined in claim 1 wherein the saturated nitrile is isobutyronitrile.

References Cited in the file of this patent

UNITED STATES PATENTS

| 2,552,268 | Emerson et al. | May 8, 1951 |
| 2,554,482 | Brown | May 29, 1951 |
| 2,554,484 | Loder | May 29, 1951 |

FOREIGN PATENTS

| 790,262 | France | Nov. 16, 1935 |
| 621,520 | Great Britain | Apr. 11, 1949 |